March 10, 1959 R. G. BUMAN ET AL 2,877,057
ENSILAGE LOADER
Filed Aug. 19, 1957 2 Sheets-Sheet 1

INVENTORS
RALPH G. BUMAN
DONALD W. BUMAN
JOSEPH J. BUMAN
BY Williamson, Schroeder, Adams & Meyers
ATTORNEYS March 10, 1959 R. G. BUMAN ET AL 2,877,057
ENSILAGE LOADER
Filed Aug. 19, 1957 2 Sheets-Sheet 2
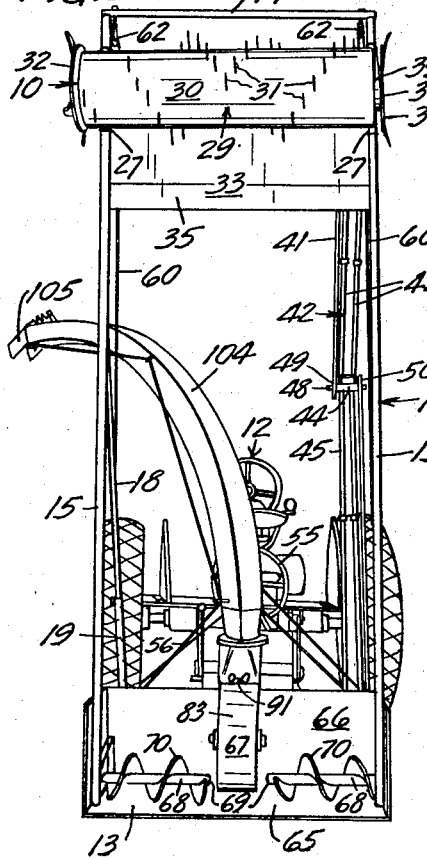
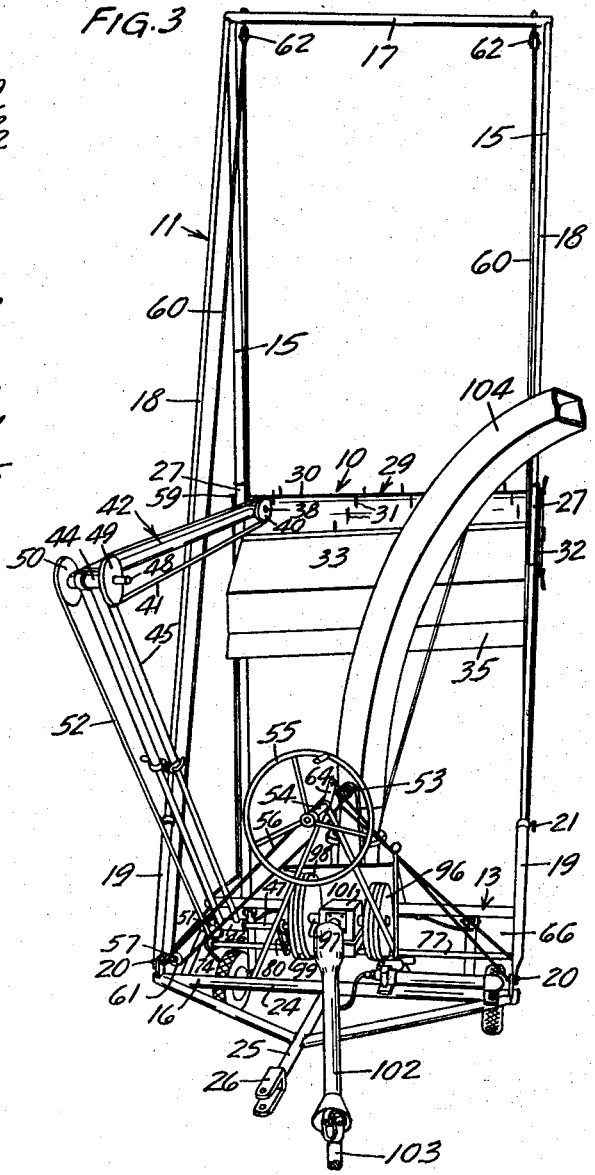
INVENTORS
RALPH G. BUMAN
DONALD W. BUMAN
JOSEPH J. BUMAN
BY
*Williamson, Schroeder, Adams & Myer*
ATTORNEYS

United States Patent Office 2,877,057
Patented Mar. 10, 1959

2,877,057

ENSILAGE LOADER

Ralph G. Buman, Harlan, Donald W. Buman, Tennant, and Joseph J. Buman, Harlan, Iowa Application August 19, 1957, Serial No. 678,885

5 Claims. (Cl. 302—56)

This invention relates to loading apparatus, and more particularly to apparatus for loosening quantities of ensilage from a pile and blowing it into a container for feeding purposes.

It is an important object of the invention to provide simple apparatus for efficiently loosening and conveying piled ensilage and the like by making vertical cuts in the pile and directing the loosened ensilage downwardly toward the conveying mechanism from which it is loaded for transportation.

Another object of the invention is to provide a novel blower mechanism adapted to receive loosened ensilage in divided streams for positive and quick loading thereof.

A further object of the invention is to provide a blower mechanism of the class described which will receive ensilage independently from both sides and in such a manner that a single rotor can blow ensilage efficiently from one side only even though the other side be choked with too fast a feed on the one hand or be substantially free and unobstructed because of sparse feeding on the other hand.

A still further object of the invention is to provide an efficient ensilage blower which will function as two independent blowers but will be provided with but a single rotor and a single housing.

These and other objects and advantages of the invention will more fully appear from the following description, made in connection with the accompanying drawings wherein like reference characters refer to the same parts throughout the several views and in which:

Figure 2 is a front view of the ensilage loader, showing its rearward connection to a tractor;

Figure 3 is a rear perspective view of the ensilage loader; and

Figure 1:
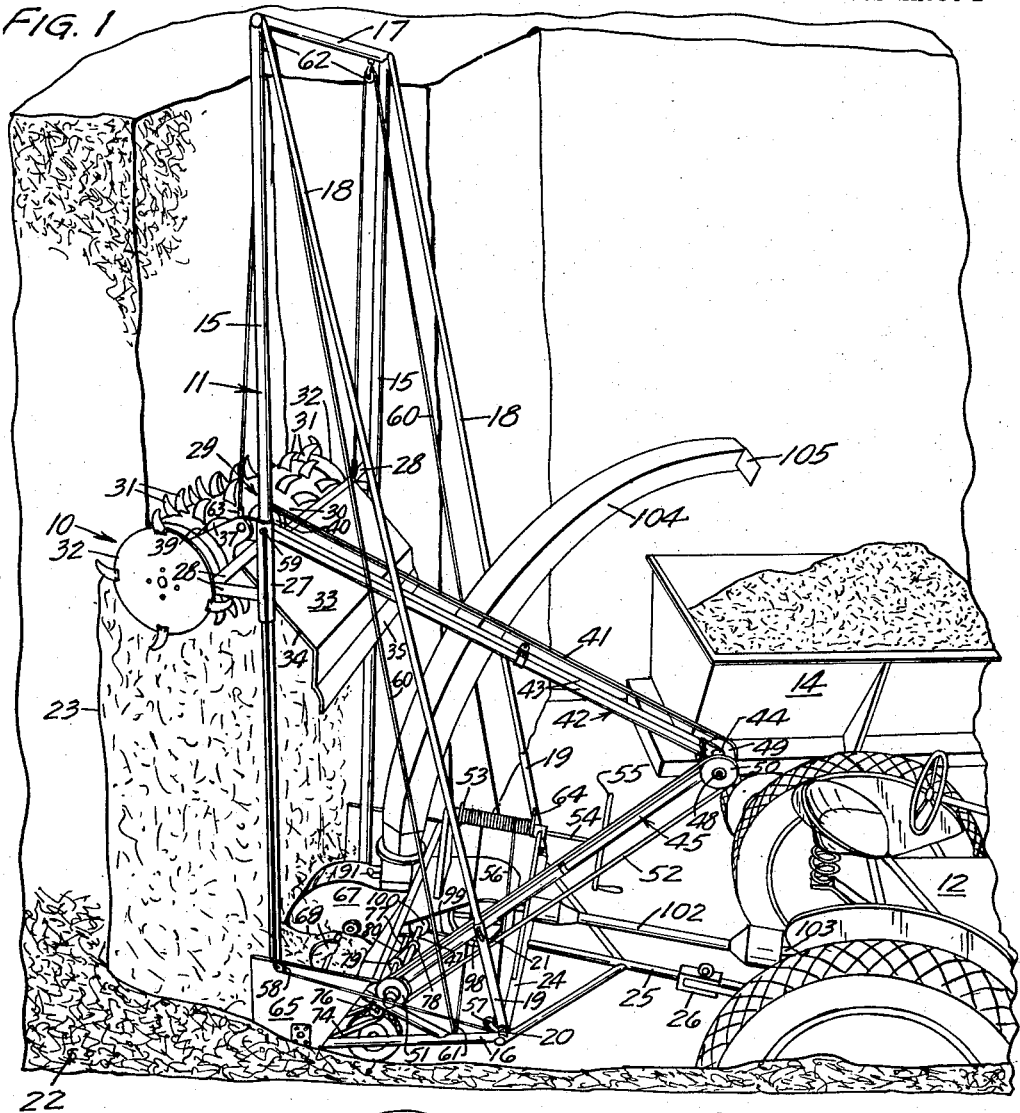
Figure 1 is a perspective view taken from an upper right hand position, the cutting and loosening mechanism being in elevated relation to the framework.

With continued reference to the drawings, our ensilage loader comprises generally a cutting and loosening mechanism 10 which is mounted for vertical reciprocation on a supporting structure 11, the latter being adapted to be transported and driven by a powered vehicle unit such as tractor 12. Below the cutting and loosening mechanism is a conveying element 13 from which the loosened material is discharged into a container structure 14 such as a feeding bin or the like.

The supporting structure 11 has a pair of spaced parallel uprights or standards 15 which are secured to a lower framework structure 16 at each side of the apparatus. The uprights are joined together by a cross brace 17, as shown in Figure 2, and rearwardly extending braces 18 provide support for standards 15 in adjusted relation with respect to sleeve elements 19 which, in turn, are pivotally fastened at 20 to lower framework 16 as shown in Figure 1. Locking elements 21 secure the brace members 18 in longitudinally adjusted relation with respect to the sleeves 19 so that the standards 15 may be rocked slightly in a forward or rearward direction with respect to lower frame 16 to maintain the cutting and loosening mechanism 10 in vertically operable relation with respect to the horizontal supporting area 22 and capable of forming a vertical ensilage wall surface 23 when the loader is in operation. Other brace members 24 are rigidly interconnected with the lower frame structure 16 and are supplied for additional strength and supporting various operational members as will be discussed in detail below.

The drawbar 25 is provided with a conventional clevis 26 to be pivotally secured to tractor 12 in the conventional manner.

Slidably mounted on the standards 15 respectively are a pair of sleeve members 27, each being provided with forwardly extending brace structure 28, across which is rotatably mounted a horizontal rotary cutter 29, in turn comprised of a drum 30 having outstanding knife blades 31 secured to the outer surface thereof and staggered in the manner shown in Figure 2. The knife blades are adapted to rotate at high speed and to cleanly cut and loosen ensilage particles to leave a vertical wall 23 in the pile. The brace members 28 are so arranged with respect to the drum 30 that an outermost end disc 32 remains at each side of the drum. Cutter blades 31 are so disposed on the outermost portion 32 that no portion of the framework will engage the ensilage 23 during operation thereof and all contact with the ensilage wall is through rotating members capable of working thereon. Also secured across the brace members 28 is a rigid baffle 33 which has a rearwardly angulated area 34 and a depending skirt 35 as shown in Figure 1. As ensilage material is loosened from the wall 23, it is thrown rearwardly and is deflected and guided downwardly by the baffle 33. The drum 30 is provided with a sheave 36 disposed between the outer disc 32 and drum 30 at one side of the drum as shown in Figure 2. A drive pulley 37 is rotatably mounted on shaft 38 which, in turn, is journaled horizontally on the framework 28 so as to provide driving connection through belt 39 with the sheave 36 on drum 30. The inner end of the shaft 38 has a sheave 40 adapted to be driven by the elongated belt 41, as shown in Figure 1.

Also journaled on the shaft 38 is an arm 42 which constitutes a pair of spaced parallel tubular members 43 which extend rearwardly and terminate in turn in a knuckle joint 44. A similar downwardly and forwardly disposed arm 45 is also pivotally secured at the knuckle joint 44 and terminates downwardly in a pivotal bearing 46 disposed on drive shaft 47 which, in turn, is journaled on the lower framework structure 16. A shaft 48 extends through the knuckle joint 44 and has a sheave 49 aligned with the sheave 40 and driving belt 41 therebetween while sheave 50 is attached to the other side of shaft 48 and aligned with sheave 51 and drivably connected therewith through the elongated belt 52, as shown in Figure 1.

It will be seen that, as the cutting and loosening element 10 is raised and lowered on the supporting standards 15, the arms 42 and 45 will converge and diverge, the sheaves associated with their pivotal points permitting continuous driving action to be maintained from the drive shaft 47 to the drum 30 irrespective of the position or movement of the cutting and loosening mechanism 10.

Means for raising and lowering the cutting and loosening mechanism 10 is provided with a cable system wherein a winch 53 supplies the motivating force. Winch 53 is journaled on a portion of framework 24 and has a rearwardly extending shaft 54 provided with a hand crank wheel 55, as shown. Winch 53 has a pair of cables 56 extending divergently to each side of the lower framework 16 and passing through respective pulley members 57 which in turn are secured to lower frame 16 adjacent the pivotal interconnection 20 with brace members 18. The cables 56 then pass forwardly through another pair of pulleys 58 which are secured with respect to the lower framework 16 adjacent the interconnection with the standards 15. The respective cables 56 then pass upwardly adjacent the respective standards 15 and are secured at their ends 59 to the sleeve supports 27 upon which the cutting and loosening mechanism is mounted. As viewed in Figure 3, if the crank wheel 55 is rotated in a clockwise direction, the cables 56 will be wound upon winch 53 and will draw the sleeves 27 as well as the rest of the cutting and loosening mechanism 10 downwardly in horizontal position and guided upon the standards 15.

Winch 53 also has a pair of cables 60 which pass downwardly to respective pulleys 61 secured to lower frame 16 at each side thereof and from which the cables 60 pass upwardly through respective pulleys 62 secured to the cross member 17 adjacent its connection at each side with uprights or standards 15. From pulleys 62 the respective ends of cables 60 pass downwardly and are secured at 63 to the brace structure 28 which is rigidly formed with the sleeve members 27. When the winch is operated in a counter-clockwise direction as viewed in Figure 3, the cables 60 will be wound thereon and will raise the entire cutting and loosening mechanism 10 on standards 15. The opposite cables 56 will, of course, unwind and follow with the cutting and loosening mechanism so as to positively and simultaneously move each end thereof when it is desired to make a cut against the ensilage wall 23. A ratchet latch means 64 may be employed to maintain the winch 53 at any adjusted position, the latch being releasable manually whenever it is desired to turn the crank wheel 55.

Figure 4:
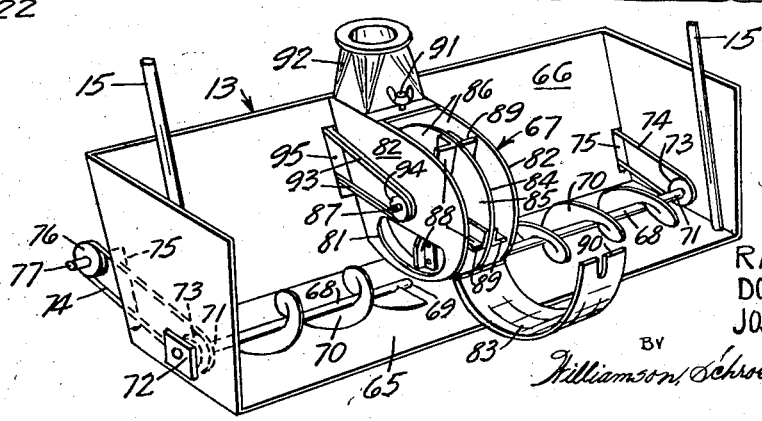
Figure 4 is an enlarged perspective view of the conveying element, portions being broken away to better show the internal structure of the parts.

Underlying the cutting and loosening mechanism and coextensive with the width of the baffle 33 is a receiving trough 65, as shown in Figures 2 and 4. The receiving trough 65 is rigidly secured with respect to lower framework 16 and has a rear upstanding wall 66 to which is secured a blower housing 67 in medial relation thereto. Journaled at each side of the blower housing 67 is a short screw conveyor 68 which terminates in a free end 69 and each having a flight 70 arranged to rotate so as to advance ensilage dropped in the trough 65 toward the medial blower housing 67. The screw conveyors 68 are journaled respectively at their outer shaft ends 71 in bearings 72. Also secured to the outer shaft ends 71 are respective sheaves 73 which are driven by flexible belts 74 extending through slots 75 cut in rear wall 66 of trough 65, as shown in Figures 2 and 4. The flexible belts 74, in turn, are driven by sheaves 76 secured to jack shaft 77. The jack shaft 77, in turn, is journaled across the lower framework 16, as shown in Figures 3 and 4. Drive shaft 47 which supplied rotational driving power to the drum 30 of the cutting and loosening mechanism 10 also is interconnected through sheaves 78 and 79 on the drive shaft 47 and jack shaft 77 respectively so that belt 80 will transmit rotary power to the screw conveyors 68 in the manner previously described, one of said screw conveyors being of right hand pitch and the other of left hand pitch so as to move ensilage material along the bottom of trough 65 toward the blower housing 67. The free ends 69 of the screw conveyor 68 terminate in alignment with openings 81 formed in each respective side wall 82 of the blower housing 67. Blower housing 67 may be provided with an arcuate door plate 83 to gain access to the interior of the housing 67, as shown in Figure 4.

The lower rotor 84 constitutes an important part of our invention. The rotor comprises a flat circular disc 85 which substantially traverses the blower 67 and rotates in close clearance with the circumference thereof. The circular plate 85 constitutes a disc-like barrier which divides the blower housing into separate compartments 86 associated with the respective openings 81 at each side of the housing. The circular plate 85 is mounted on shaft 87 which extends outwardly to one side of the housing as shown in Figure 4. The circular disc 85 is provided with vanes 88 which extend outwardly to each side of the plate and terminate outwardly in edges 89 and which also operate in close clearance with the interior of the blower housing 67. When the arcuate plate 83 is closed and locked in place at its flanged end 90 by means of fastening element 91, the rotation of the rotor 84 will be in clockwise direction as viewed in Figure 4, and will, in effect, provide independent blower means, each with an opening 81 but utilizing but a single rotor, a single housing, and a single discharge 92. The rotor 84 is driven by belt means 93 drivably connected with sheave 94 on shaft 87 and extending rearwardly through a slot 95 formed at the rear wall 66 of the trough 65. Belt means 93 extends around the drive sheave 96 which, in turn, is secured to power shaft 97, as shown in Figure 3.

The power shaft 97 also has a second sheave 98 which drives the drive shaft 47 through belt means 99 and pulley 100 secured to drive shaft 47. The power shaft 97, in turn, is mounted in a gear box 101 which is powered by a connecting shaft 102 adapted to be connected, in turn, to the power take-off 103 on tractor 12.

The blower outlet 92 has a delivery spout 104 which is adjustably secured thereto and terminates in a baffled nozzle 105 overlying the receiving container 14.

The use and operation of our ensilage loader will be obvious from the foregoing description insofar as the cutting and loosening of the wall of ensilage is concerned. Particular attention, however, is directed to the conveying element and to the novel cooperation between the cutting and loosening mechanism and the conveying element. Particles of loosened ensilage are baffled downwardly at all times irrespective of the position of the cutting and loosening mechanism and will fall in a continuous sheet, one portion falling to the left of the blower housing 67 and another to the right thereof. Obviously it will not be possible to maintain an even flow of material to each side of the blower at all times, and, at times, one or the other of the openings 81 will tend to become choked with excess feeding of ensilage. Because of our particular blower structure, the independent chambers 86 will create a partial vacuum in accordance with the operation at the particular side and independently of the condition of the other. Thus, if the opening 81 to the left side of blower housing 67 in Figure 4 should become momentarily clogged or choked, the partial vacuum within the chamber 86 to the left of the disc-like barrier 85 will immediately increase and stronger sucking action will be exerted upon the ensilage at that side to pull the choked material into the blower. If the rotor structure were such as to permit air to freely pass between the two chamber portions 86 then, of course, the unobstructed opening 81 would merely receive more air and the choked opening would not have the same degree of tendency toward being relieved.

The net result of our ensilage loading apparatus is to provide a rigid and clean operation for loading ensilage directly from the piled material, minimizing wastage by maintaining the pile in compact and sheer walled condition, yet conveying the entire loosened material without special attention to even feeding thereof to the conveying element. The foregoing has been accomplished with economy and utilization of single members to produce multiple results.

It will, of course, be understood that various changes may be made in the form, details, arrangement and proportions of the parts without departing from the scope of the invention.

What is claimed is:

1. An ensilage loader comprising a cutting and loosening mechanism for directing ensilage downwardly for loading, a blower housing having feed openings at each side thereof and a tangentially disposed blower spout communicating therewith and adapted to simultaneously receive the downwardly directed ensilage from both sides, means feeding the ensilage into said blower housing through said feed openings from each side thereof, a rotor journaled horizontally across the blower housing and having a disc-like barrier substantially traversing the interior of the housing and aligned with said blower spout, and vane means mounted at each side of the disc-like barrier in laterally outstanding relation thereto whereby feed entering one opening at a side of the blower housing is acted upon by the rotor completely independently of feed entering the other opening, said barrier preventing partial vacuum caused by one choked feed opening from being relieved by excess air intake through the other feed opening.

2. An ensilage loader comprising cutting and loosening mechanism for directing downwardly ensilage or the like to be loaded for feeding purposes, a horizontal receiving trough adapted to collect ensilage particles along the length thereof, feed means for moving the ensilage material from the ends of the receiving trough simultaneously toward the center, a blower housing having feed openings at each side thereof and a tangentially disposed blower spout communicating therewith and adapted to simultaneously receive ensilage material from both sides, a rotor journaled horizontally across the blower housing and having a disc-like barrier substantially traversing the interior of the housing and aligned with said blower spout, and vane means mounted at each side of the disc-like barrier in laterally outstanding relation thereto whereby feed entering one opening at a side of the blower housing is acted upon by the rotor completely independently of feed entering the other opening, said barrier preventing partial vacuum caused by one choked feed opening from being relieved by excess air intake through the other.

3. In an ensilage loader, rotary cutting means mounted thereon for vertical reciprocation forwardly against piled ensilage or the like, a baffle disposed rearwardly of the rotary cutting means and terminating downwardly in a free edge for directing loosened and cut ensilage in a downward direction, a horizontal receiving trough adapted to collect ensilage directed downwardly by said baffle along the length thereof, feed means for moving the ensilage material from the ends of the receiving trough simultaneously toward the center, a blower housing having feed openings at each side thereof and a tangentially disposed blower spout communicating therewith and adapted to simultaneously receive ensilage material from both sides, a rotor journaled horizontally across the blower housing and having a disc-like barrier substantially traversing the interior of the housing and aligned with said blower spout, and vane means mounted at each side of the disc-like barrier in laterally outstanding relation thereto whereby feed entering one opening at a side of the blower housing is acted upon by the rotor completely independently of feed entering the other opening, said barrier preventing partial vacuum caused by a choked feed opening at one side of the housing from being relieved by excess air intake through the other opening.

4. In an ensilage loader, cutting and loosening mechanism for directing downwardly ensilage or the like to be loaded for feeding purposes, a horizontal receiving trough adapted to collect ensilage material along the length thereof, a pair of screw feeds, one disposed at each end of said receiving trough for moving the ensilage material from the ends thereof simultaneously toward the center, a blower housing having feed openings at each side thereof, said screw feeds being aligned with the respective screw feed means, a tangentially disposed blower spout communicating with said blower housing, a rotor journaled horizontally across the blower housing at a position above said feed openings, said rotor having a disc-like barrier substantially traversing the interior of the housing and aligned with said blower spout, and vane means mounted at each side of the disc-like barrier in laterally outstanding relation thereto whereby feed entering one opening at a side of the blower housing is acted upon by the rotor completely independently of feed entering the other opening, said barrier preventing partial vacuum caused by a choked feed opening at one side of the housing from being relieved by excess air intake through the other of said openings.

5. In an ensilage loader, cutting and loosening mechanism for directing downwardly ensilage or the like to be loaded for feeding purposes, a horizontal feeding trough adapted to collect ensilage particles along the length thereof, feed means for moving ensilage material from the ends of the receiving trough simultaneously toward the center, a blower housing having feed openings at each side thereof and a tangentially disposed blower spout communicating therewith and adapted to simultaneously receive ensilage material from both sides, a shaft rotatably journaled horizontally across the blower housing, a circular plate secured to the shaft, the general plane thereof bisecting the blower spout and adapted to rotate in close clearance with said blower housing and a plurality of vanes secured at each side of said circular plate, whereby feed entering one opening at a side of the blower housing is acted upon by the rotor completely independently of feed entering the other opening, said barrier preventing partial vacuum created by choked feeding at one feed opening from being relieved by excess air intake through the other of said feed openings.

References Cited in the file of this patent

UNITED STATES PATENTS

| | | |
|---|---|---|
| 2,127,985 | Philpot | Aug. 28, 1938 |
| 2,482,723 | Wallace | Sept. 20, 1949 |
| 2,724,481 | Oswalt | Nov. 22, 1955 |